(12) United States Patent
Yang et al.

(10) Patent No.: US 10,623,720 B2
(45) Date of Patent: Apr. 14, 2020

(54) LIQUID CRYSTAL GRATING, DRIVING METHOD THEREOF AND THREE-DIMENSIONAL DISPLAY DEVICE

(71) Applicant: BOE Technology Group Co., Ltd., Beijing (CN)

(72) Inventors: Ming Yang, Beijing (CN); Xiaochuan Chen, Beijing (CN); Wenqing Zhao, Beijing (CN); Chenyu Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/276,688

(22) Filed: Feb. 15, 2019

(65) Prior Publication Data

US 2019/0335163 A1    Oct. 31, 2019

(30) Foreign Application Priority Data

Apr. 28, 2018 (CN) .......................... 2018 1 0399826

(51) Int. Cl.
*H04N 13/302* (2018.01)
*G02B 27/22* (2018.01)
*G02F 1/133* (2006.01)
*G02F 1/1343* (2006.01)
*G02F 1/1362* (2006.01)
*G09G 3/36* (2006.01)

(52) U.S. Cl.
CPC .......... *H04N 13/302* (2018.05); *G02B 27/22* (2013.01); *G02F 1/1343* (2013.01); *G02F 1/13306* (2013.01); *G02F 1/136286* (2013.01); *G09G 3/3648* (2013.01); *G02F 2001/136218* (2013.01)

(58) Field of Classification Search
CPC .. H04N 13/302; G02B 27/22; G02F 1/13306; G02F 1/1343; G02F 1/136286
See application file for complete search history.

(56) References Cited

U.S. PATENT DOCUMENTS

| 8,817,369 B2 * | 8/2014 | Daiku | G02B 27/0093 359/464 |
| 2009/0002267 A1 * | 1/2009 | Nam | G02B 27/2214 345/6 |
| 2014/0022241 A1 * | 1/2014 | Lee | G02B 27/2214 345/419 |

(Continued)

*Primary Examiner* — Ariel A Balaoing
(74) *Attorney, Agent, or Firm* — Westman, Champlin & Koehler, P.A.

(57) ABSTRACT

A liquid crystal grating, a driving method thereof and a 3D display device are provided. The liquid crystal grating includes: a plurality of periodical grating units, wherein each of the periodical grating units includes a plurality of strip-like electrodes; a first primary driving circuitry configured to drive the plurality of strip-like electrodes, to form a light-shielding section and a light-transmitting section in each of the periodical grating units; at least one second primary driving circuitry configured to drive the plurality of strip-like electrodes, to form the light-shielding section and the light-transmitting section in each of the periodical grating units; and a control circuitry configured to select the first primary driving circuitry or the second primary driving circuitry to drive the strip-like electrodes in accordance with a distance between a user and the liquid crystal grating.

20 Claims, 6 Drawing Sheets

(56) References Cited

U.S. PATENT DOCUMENTS

| | | | |
|---|---|---|---|
| 2014/0226094 A1* | 8/2014 | Lee | G02B 27/2214 349/15 |
| 2015/0036211 A1* | 2/2015 | Chen | G02B 27/2214 359/462 |
| 2016/0260371 A1* | 9/2016 | Wang | G02B 5/23 |
| 2017/0230642 A1* | 8/2017 | Suzuki | H04N 13/373 |

* cited by examiner

LIQUID CRYSTAL GRATING, DRIVING METHOD THEREOF AND THREE-DIMENSIONAL DISPLAY DEVICE

CROSS-REFERENCE TO RELATED APPLICATION

The present application claims a priority of the Chinese patent application No. 201810399826.8 filed on Apr. 28, 2018, which is incorporated herein by reference in its entirety.

TECHNICAL FIELD

The present disclosure relates to the manufacture of a display product, in particular to a liquid crystal grating, a method for driving the liquid crystal grating, and a three-dimensional (3D) display device.

BACKGROUND

In recent years, along with the rapid development of the glasses-free 3D display technology, grating-type glasses-free 3D technology has become an important trend due to a simple manufacture process and an excellent 3D display effect. For a conventional display device with a liquid crystal grating, there exists an optimum viewing position. When a viewer is located at the optimum viewing position, the viewer's left eye and right eye may view a corresponding left-eye image and a corresponding right-eye image respectively, and at this time, an optimum 3D display effect may be achieved due to low crosstalk. However, when the viewer is located at a position other than the optimum viewing position, i.e., when the viewer's eyes move front or back relative to a screen of the display device, it is impossible for the viewer to view the corresponding images, and at this time, the 3D display effect may be adversely affected due to the significant crosstalk.

SUMMARY

An object of the present disclosure is to provide a liquid crystal grating, a method for driving the liquid crystal grating, and a 3D display device.

In one aspect, the present disclosure provides in some embodiments a liquid crystal grating, including: a plurality of periodical grating units, wherein each of the periodical grating units includes a first substrate, a second substrate arranged opposite to the first substrate, and a liquid crystal layer arranged between the first substrate and the second substrate, and a plurality of strip-like electrodes is arranged on the first substrate; a first primary driving circuitry configured to drive the plurality of strip-like electrodes, to form a light-shielding section and a light-transmitting section in each of the periodical grating units, and the quantity of the strip-like electrodes in each of the periodical grating units is a first value; at least one second primary driving circuitry configured to drive the plurality of strip-like electrodes, to form the light-shielding section and the light-transmitting section in each of the periodical grating units, enable the quantity of the strip-like electrodes in each of ones of the periodical grating units corresponding to a crosstalk-free position to be the first value, and enable the quantity of the strip-like electrodes in each of other ones of the periodical grating units corresponding to a crosstalk position to be a second value, wherein the second value is greater than the first value; and a control circuitry configured to select the first primary driving circuitry or one of the at least one second primary driving circuitry to drive the plurality of strip-like electrodes in accordance with a distance between a user and the liquid crystal grating.

In a possible embodiment of the present disclosure, the first primary driving circuitry includes a first driving circuit and a plurality of first switching circuits. Each of the first switching circuits includes a control end, a first end and a second end. The plurality of strip-like electrodes corresponds to the plurality of first switching circuits respectively, the first end of each of the first switching circuits is connected to a respective one of the strip-like electrodes, the second end of each of the first switching circuits is connected to the first driving circuit, and the control end of each of the first switching circuits is connected to a first control signal line. Each of the first switching circuits is configured to enable the respective strip-like electrode to be electrically connected to, or electrically disconnected from, the first driving circuit under the control of the first control signal line. The first driving circuit is configured to apply a first voltage to ones of the strip-like electrodes for forming the light-shielding section, and apply a second voltage to other ones of the strip-like electrodes for forming the light-transmitting section, wherein the second voltage is different from the first voltage.

In a possible embodiment of the present disclosure, the first driving circuit includes a first driving sub-circuit. The first driving sub-circuit is connected to the second end of a respective one of the first switching circuits via at least one first driving signal line, and configured to apply the first voltage to the ones of the strip-like electrodes for forming the light-shielding section. The first driving sub-circuit is further connected to the second end of the respective one of the first switching circuits via at least one second driving signal line, and configured to apply the second voltage to the other ones of the strip-like electrodes for forming the light-transmitting section.

In a possible embodiment of the present disclosure, each of the first switching circuits is a Thin Film Transistor (TFT), and a same driving signal line is shared by one of the strip-like electrodes in each of the plurality of periodical grating units, and the one of the strip-like electrodes in each of the plurality of periodical grating units is located at a same position with respect to the strip-like electrodes.

In a possible embodiment of the present disclosure, the second primary driving circuitry includes a second driving circuit, and a plurality of second switching circuits, wherein each of the second switching circuits includes a control end, a first end and a second end. The plurality of strip-like electrodes corresponds to the plurality of second switching circuits respectively, the first end of each of the second switching circuits is connected to a respective one of the strip-like electrodes, the second end of each of the second switching circuits is connected to the second driving circuit, and the control end of each of the second switching circuits is connected to a second control signal line. Each of the second switching circuits is configured to enable the respective strip-like electrode to be electrically connected to, or electrically disconnected from, the second driving circuit under the control of the second control signal line. The second driving circuit is configured to apply a first voltage to a portion of ones of the strip-like electrodes corresponding to a crosstalk-free position to form the light-shielding section, apply a second voltage to another portion of the ones of the strip-like electrodes corresponding to the crosstalk-free position to form the light-transmitting section, and apply a crosstalk compensation voltage to ones of the strip-like electrodes corresponding to the crosstalk position, to enable the quantity of the strip-like electrodes in each of ones of the periodical grating units corresponding to the crosstalk position to be the second value, wherein the second voltage is different from the first voltage.

In a possible embodiment of the present disclosure, the second driving circuit includes: a second driving sub-circuit connected to the second end of a respective one of the second switching circuits via a driving signal line, and configured to apply a voltage to ones of the strip-like electrodes corresponding to the crosstalk-free position, to form the light-shielding section and the light-transmitting section in each of the ones of the periodical grating units corresponding to the crosstalk-free position; and a third driving sub-circuit connected to the second ends of ones of the second switching circuits corresponding to the crosstalk position via a crosstalk compensation signal line, and configured to apply the crosstalk compensation voltage to at least one of the plurality of strip-like electrodes, to enable the quantity of the strip-like electrodes for the periodical grating unit corresponding to the at least one of the strip-like electrodes to be the second value.

In a possible embodiment of the present disclosure, each of the second switching circuits is a TFT, and a same driving signal line is shared by one of the strip-like electrodes in each of the plurality of periodical grating units, and the one of the strip-like electrodes in each of the plurality of periodical grating units is located at a same position with respect to the strip-like electrodes.

In a possible embodiment of the present disclosure, the control circuitry includes a distance detection circuit configured to detect the distance between the user and the liquid crystal grating.

In a possible embodiment of the present disclosure, the control circuitry further includes a determination sub-circuit and a control sub-circuit. The determination sub-circuit is configured to determine whether the distance between the user and the liquid crystal grating is within a first range, transmit a first indication signal to the control sub-circuit in the case that the distance between the user and the liquid crystal grating is within the first range, and transmit a second indication signal in the case that the distance between the user and the liquid crystal grating is within a second range, wherein the second range is different from the first range. The control sub-circuit is configured to: upon the receipt of the first indication signal, apply a turn-on control signal to the first control signal line, to control the first primary driving circuitry to drive the plurality of strip-like electrodes, and apply a turn-off control signal to the second control signal line; and upon the receipt of the second indication signal, apply the turn-off control signal to the first control signal line, and apply the turn-on control signal to the second control signal line, to control the second primary driving circuitry to drive the plurality of strip-like electrodes.

In another aspect, the present disclosure provides in some embodiments a 3D display device including a display panel and the above-mentioned liquid crystal grating.

In yet another aspect, the present disclosure provides in some embodiments a method for driving the above-mentioned liquid crystal grating, including: detecting a distance between a user and the liquid crystal grating; and selecting the first primary driving circuitry or one of the second primary driving circuitries to drive the plurality of strip-like electrodes.

In a possible embodiment of the present disclosure, the selecting the first primary driving circuitry or one of the second primary driving circuitries to drive the plurality of strip-like electrodes includes: determining whether the distance between the user and the liquid crystal grating is within a first range, transmitting a first indication signal to the control sub-circuit in the case that the distance between the user and the liquid crystal grating is within the first range, and transmitting a second indication signal in the case that the distance between the user and the liquid crystal grating is within a second range different from the first range; upon the receipt of the first indication signal, applying a turn-on control signal to the first control signal line so as to control the first primary driving circuitry to drive the plurality of strip-like electrodes, and applying a turn-off control signal to the second control signal line; and upon the receipt of the second indication signal, applying the turn-off control signal to the first control signal line, and applying the turn-on control signal to the second control signal line so as to control the second primary driving circuitry to drive the plurality of strip-like electrodes.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
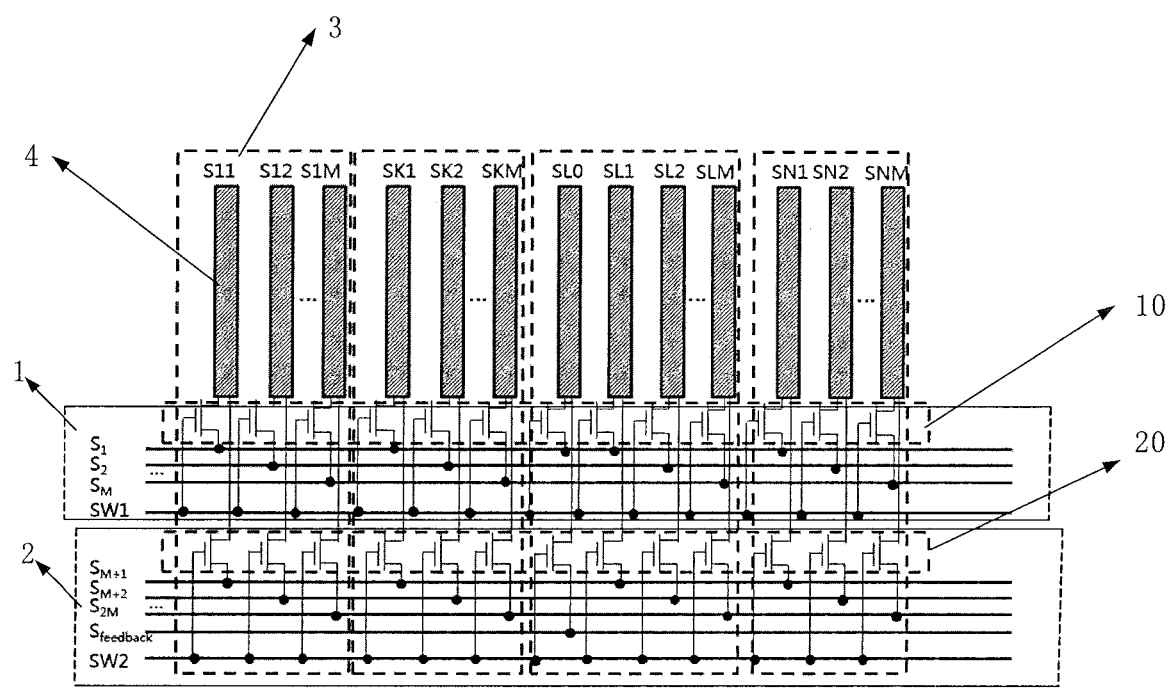
FIG. 1 is a schematic view showing a liquid crystal grating according to one embodiment of the present disclosure.
Figure 9:
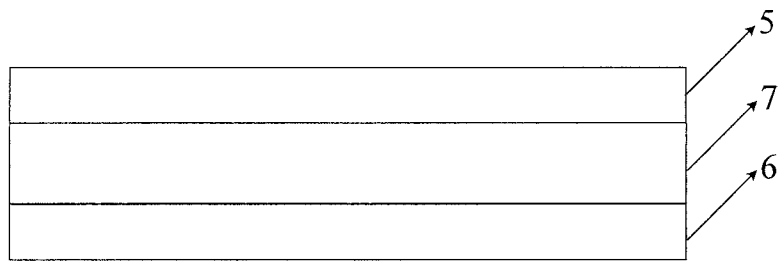
FIG. 9 is a schematic view showing a periodical grating unit according to one embodiment of the present disclosure.
Figure 10:
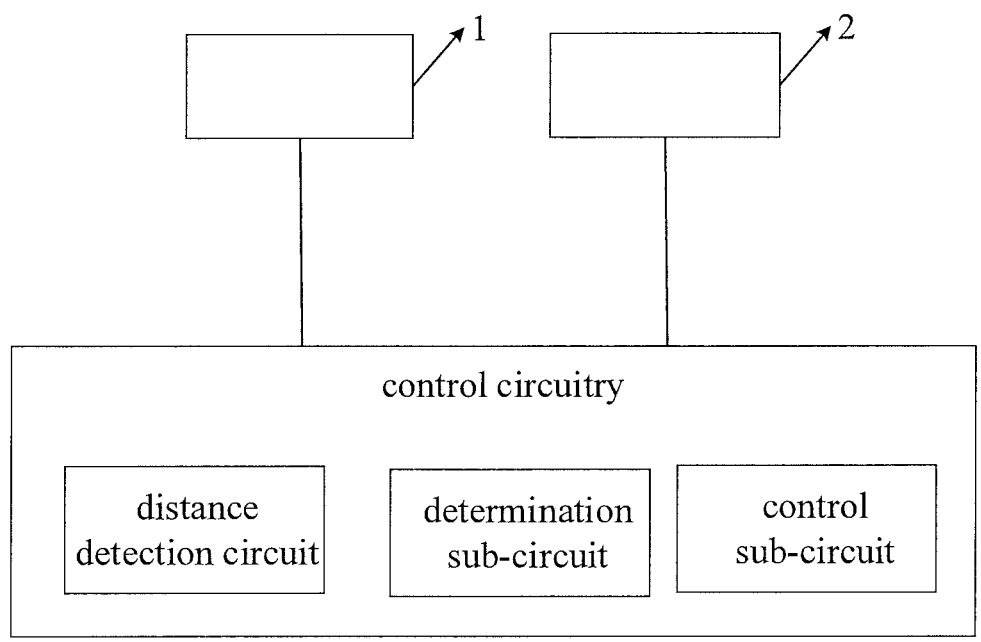
FIG. 10 is a schematic view showing a control circuitry according to one embodiment of the present disclosure.

As shown in FIGS. 1, 9 and 10, the present disclosure provides in some embodiments a liquid crystal grating which includes: a plurality of periodical grating units 3, each periodical grating unit 3 including a first substrate 5, a second substrate 6 arranged opposite to the first substrate 5, and a liquid crystal layer 7 arranged between the first substrate 5 and the second substrate 6, a plurality of strip-like electrodes 4 being arranged on the first substrate 5; a first primary driving circuitry 1 configured to drive the plurality of strip-like electrodes 4, so as to form a light-shielding section and a light-transmitting section in each periodical grating unit 3, the quantity of the strip-like electrodes in each periodical grating unit 3 being a first value; at least one second primary driving circuitry 2 configured to drive the plurality of strip-like electrodes 4, so as to form a light-shielding section and a light-transmitting section in each periodical grating unit 3, the quantity of the strip-like electrodes in each periodical grating unit corresponding to a crosstalk-free position being the first value, the quantity of the strip-like electrodes in each periodical grating unit corresponding to a crosstalk position being a second value greater than the first value; and a control circuitry connected to the first primary driving circuitry 1 and the second primary driving circuitries 2, and configured to select the first primary driving circuitry 1 or one of the second primary driving circuitries 2 to drive the plurality of strip-like electrodes 4 in accordance with a distance between a user and the liquid crystal grating.

According to the embodiments of the present disclosure, when the distance between the user and the liquid crystal grating is within a first range (in the first range, a good 3D display effect may be achieved due to no crosstalk), the first primary driving circuitry 1 may be selected under the control of the control circuitry, so as to drive the plurality of strip-like electrodes 4. When the distance between the user and the liquid crystal grating is within a second range different from the first range (in the second range, the 3D display effect may be adversely affected due to the crosstalk), one of the second primary driving circuitries 2 corresponding to the distance between the user and the liquid crystal grating may be selected under the control of the control circuitry, so as to drive the plurality of strip-like electrodes 4, and increase the quantity of the strip-like electrodes in the periodical grating unit corresponding to a crosstalk position, thereby to perform crosstalk compensation. As a result, it is able to improve the 3D display effect when the user is located at a position beyond the first range. As a result, the user may view a good 3D image even when the user is located at one of various positions beyond the first range.

Figure 2:
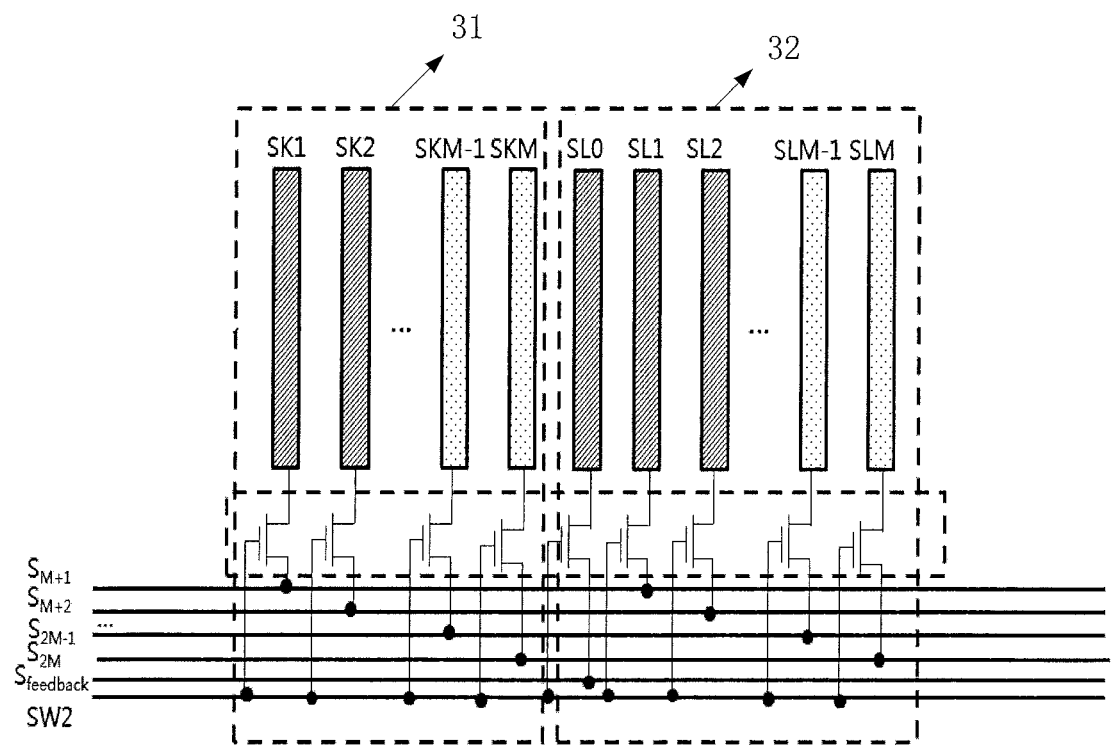
FIG. 2 is another schematic view showing the liquid crystal grating according to one embodiment of the present disclosure.
Figure 3:
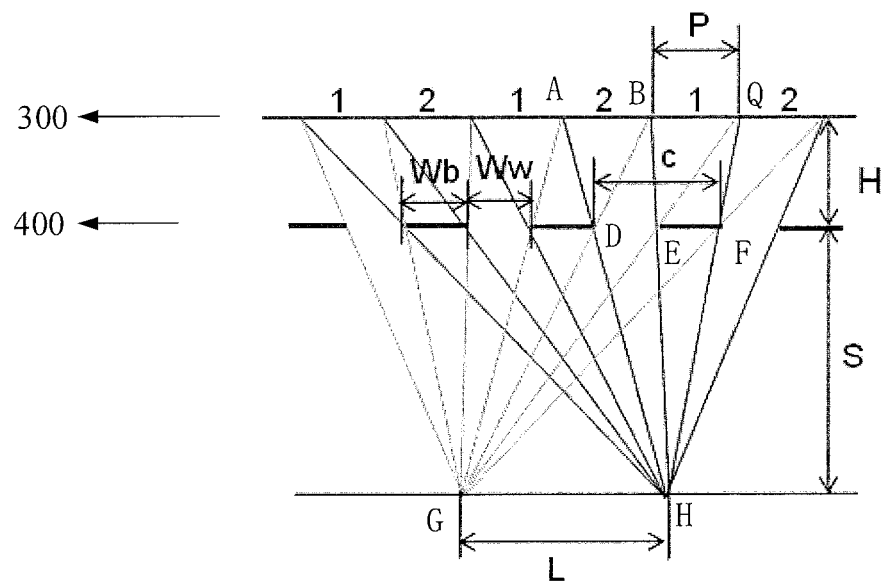
FIG. 3 is a schematic view showing an optical path according to one embodiment of the present disclosure.

When the distance between the user and the liquid crystal grating is S (S is within the first range), there is no crosstalk. At this time, the plurality of strip-like electrodes 4 may be driven by the first primary driving circuitry 1, and the quantity of the strip-like electrodes in each periodical grating unit 3 may be the first value. FIG. 3 shows an optical path acquired when the plurality of strip-like electrodes is driven by the first primary driving circuitry 1. In FIG. 3, G represents a position where a user's left eye is located, and H represents a position where a user's right eye is located. At this time, it is merely able for the user's left eye to view an image 1 displayed on a display panel 300 through each light-transmitting section Ww of the liquid crystal grating 400, and it is merely able for the user's right eye to view an image 2 displayed on the display panel 300 through each light-transmitting section Ww of the liquid crystal grating 400, i.e., there is no crosstalk. In FIG. 2, when the distance between the user and the liquid crystal grating is S1 (S1 is within the second range), there is the crosstalk, and the plurality of strip-like electrodes may be driven by the corresponding second primary driving circuitry 2, so as to perform the crosstalk compensation at the crosstalk position. At this time, the quantity of the strip-like electrodes in each periodical grating unit corresponding to the crosstalk-free position may remain unchanged, i.e., the first value, while the quantity of the strip-like electrodes in each periodical grating unit corresponding to the crosstalk position may be the second value, i.e., the quantity of the strip-like electrodes may increase (a strip-like electrode SL0 is added).

Figure 4:
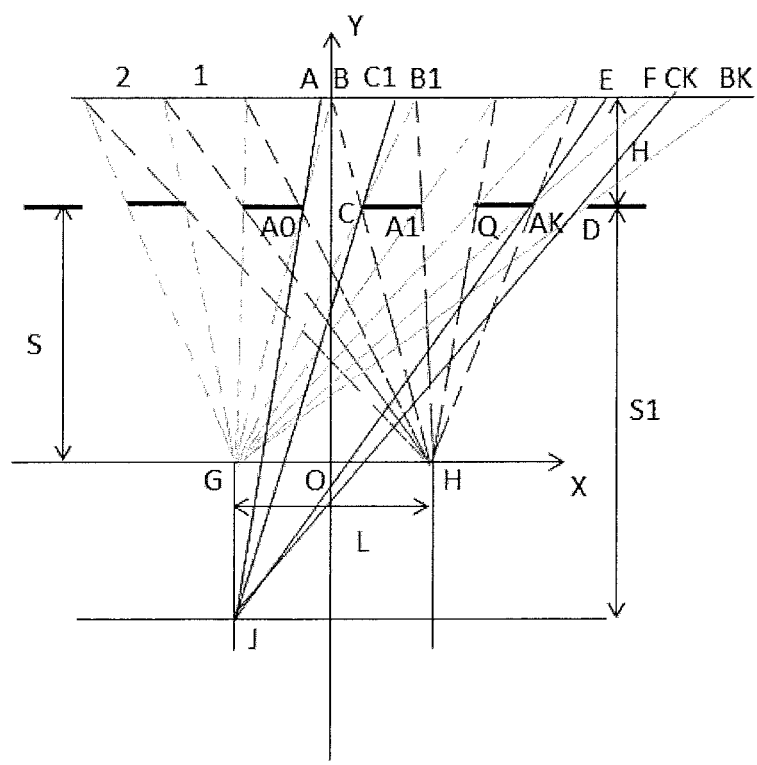
FIG. 4 is another schematic view showing the optical path according to one embodiment of the present disclosure.
Figure 5:
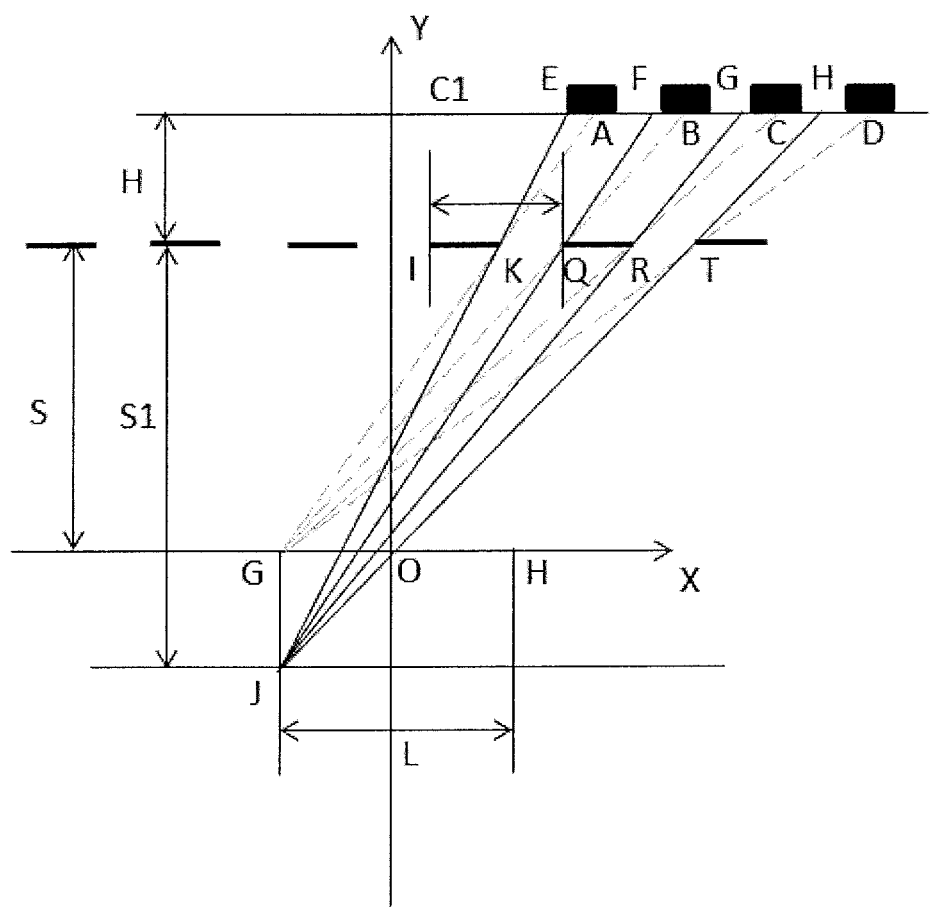
FIG. 5 is yet another schematic view showing the optical path according to one embodiment of the present disclosure.
Figure 6:
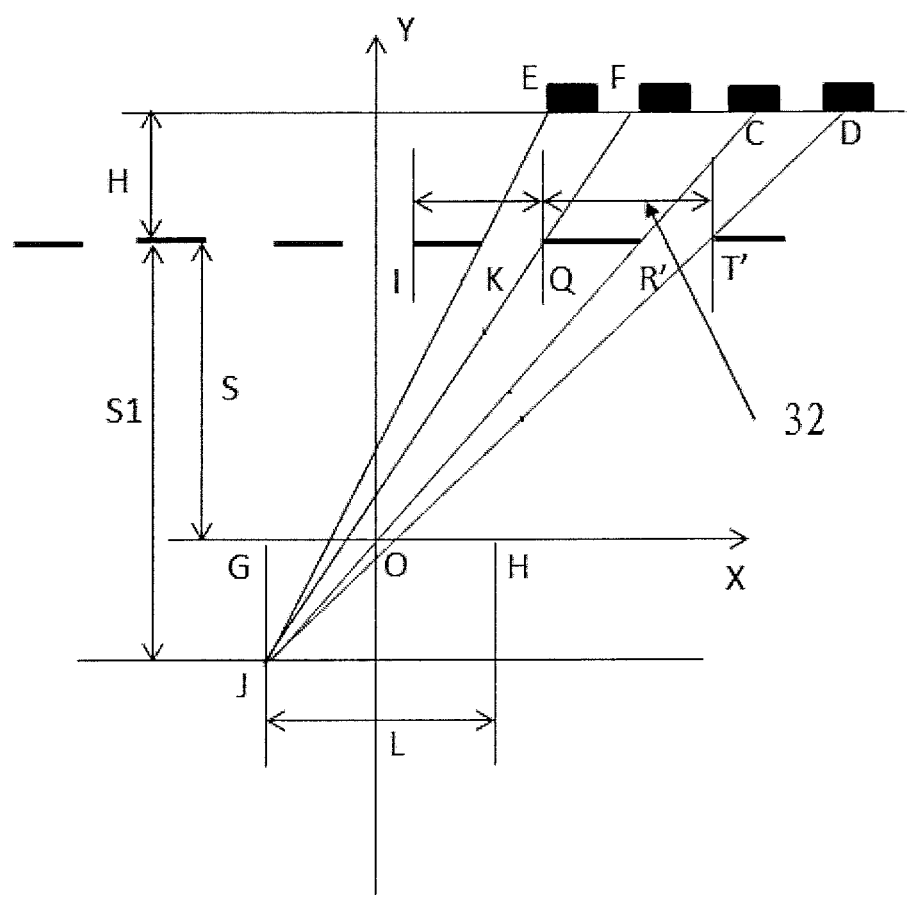
FIG. 6 is still yet another schematic view showing the optical path according to one embodiment of the present disclosure.

FIGS. 4 and 5 each show the optical path when there is the crosstalk. Due to the deviation of the viewing position, the crosstalk may occur (in FIGS. 4 and 5, each solid line represents the optical path where the crosstalk occurs, and each dotted line represents the optical path where no crosstalk occurs). FIG. 6 shows the optical path after the crosstalk compensation at the crosstalk position. By comparing FIG. 5 with FIG. 6, in FIG. 5, the region GH may be viewed through a light-transmitting section RT of a $(K+1)^{th}$ periodical grating unit (QT represents the $(K+1)^{th}$ periodical grating unit) from the region GH, and at this time, the point G is located beyond a corresponding black matrix, so the crosstalk may occur. In FIG. 6, due to an increase in the quantity of the strip-like electrodes corresponding to the $(K+1)^{th}$ periodical grating unit 32 (i.e., QT'), a light-shielding section QR' of the $(K+1)^{th}$ periodical grating unit may have a width greater than a width of a light-shielding section QR of the $(K+1)^{th}$ periodical grating unit in FIG. 5 (in FIG. 2, the quantity of the strip-like electrodes for forming the light-shielding section in the $(K+1)^{th}$ periodical grating unit corresponding to the crosstalk position is greater than the quantity of the strip-like electrodes for forming the light-shielding section in a $K^{th}$ periodical grating unit corresponding to the crosstalk-free position), and the region CD may be viewed through a light-transmitting section R'T' of the $(K+1)^{th}$ periodical grating unit from the region CD. At this time, the points C and D are both located within the black matrices respectively, so it is able to achieve the crosstalk compensation and improve the 3D display effect.

The first primary driving circuitry 1 may be of various structures. In a possible embodiment of the present disclosure, the first primary driving circuitry 1 may include a first driving circuit and a plurality of first switching circuits (in FIG. 1, the plurality of first switching circuits is located within a first dotted box 10, and a circuit included in the first primary driving circuitry 1 other than the first switching circuits is just the first driving circuit). Each first switching circuit may include a control end, a first end and a second end.

The plurality of strip-like electrodes may correspond to the plurality of first switching circuits respectively, the first end of each first switching circuit may be connected to a corresponding one of the strip-like electrodes, the second end of each first switching circuit may be connected to the first driving circuit, and the control end of each first switching circuit may be connected to a first control signal line.

Each first switching circuit may be configured to enable the corresponding strip-like electrode to be electrically connected to, or electrically disconnected from, the first driving circuit under the control of the first control signal line.

The first driving circuit may be configured to apply a first voltage to each strip-like electrode for forming the light-shielding section, and apply a second voltage different from the first voltage to each strip-like electrode for forming the light-transmitting section.

In a possible embodiment of the present disclosure, the first driving circuit may include a first driving sub-circuit connected to the second end of a corresponding first switching circuit via at least one first driving signal line so as to apply the first voltage to each strip-like electrode for forming the light-shielding section, and connected to the second end of a corresponding first switching circuit via at least one second driving signal line so as to apply the second voltage to each strip-like electrode for forming the light-transmitting section.

As shown in FIGS. 1 and 2, in a possible embodiment of the present disclosure, each first switching circuit may be, but not limited to, a TFT, and a same driving signal line is shared by one of the strip-like electrodes in each of the plurality of periodical grating units, and the one of the strip-like electrodes in each of the plurality of periodical grating units is located at a same position with respect to the strip-like electrodes. For example, in FIG. 1, a first driving signal sub-line S1 is shared by first strip-like electrodes S11, SK1, SL1 and SN1 of the periodical grating units, a second driving signal sub-line S2 is shared by second strip-like electrodes S12, SK2, SL2 and SN2 of the periodical grating units, and an $M^{th}$ driving signal sub-line $S_M$ is shared by $M^{th}$ strip-like electrodes S1M, SKM, SLM and SNM of the periodical grating units, so as to control the strip-like electrodes independently for each periodical grating unit, integrally control the strip-like electrodes at the same position among the periodical grating units of each periodical grating unit, and simplify a circuit structure. Each first switching circuit may be configured to control the corresponding strip-like electrode to be electrically connected to, or electrically disconnected from, the first driving circuit under the control of the first control signal line SW1.

In this embodiment, as shown in FIGS. 1 and 2, the second primary driving circuitry 2 may include a second driving circuit, and a plurality of second switching circuits (in FIG. 1, the plurality of second switching circuits is located within a second dotted box 20, and a circuit included in the second primary driving circuitry 2 other than the second switching circuits is just the second driving circuit). Each second switching circuit may include a control end, a first end and a second end.

The plurality of strip-like electrodes may correspond to the plurality of second switching circuits respectively, the first end of each second switching circuit may be connected to a respective one of the strip-like electrodes, the second end of each second switching circuit may be connected to the second driving circuit, and the control end of each second switching circuit may be connected to a second control signal line.

Each second switching circuit may be configured to enable the corresponding strip-like electrode to be electrically connected to, or electrically disconnected from, the second driving circuit under the control of the second control signal line.

The second driving circuit may be configured to apply a first voltage to a portion of the strip-like electrodes corresponding to the crosstalk-free position so as to form the light-shielding section, apply a second voltage different from the first voltage to another portion of the strip-like electrodes corresponding to the crosstalk-free position so as to form the light-transmitting section, and apply a crosstalk compensation voltage to each strip-like electrode corresponding to the crosstalk position so as to enable the quantity of the strip-like electrodes in each periodical grating unit corresponding to the crosstalk position to be the second value.

In a possible embodiment of the present disclosure, the second driving circuit may include: a second driving sub-circuit connected to the second end of a corresponding second switching circuit via a driving signal line, and configured to apply a voltage to each strip-like electrode corresponding to the crosstalk-free position, so as to enable form the light-shielding section and the light-transmitting section in each periodical grating unit corresponding to the crosstalk-free position; and a third driving sub-circuit connected to the second end of each second switching circuit corresponding to the crosstalk position via a crosstalk compensation signal line, and configured to apply the crosstalk compensation voltage to at least one of the plurality of strip-like electrodes, so as to enable the quantity of the strip-like electrodes for the periodical grating unit corresponding to the at least one strip-like electrode to be the second value.

In a possible embodiment of the present disclosure, each second switching circuit may be, but not limited to, a TFT.

A connection mode of the plurality of strip-like electrodes corresponding to the crosstalk-free position in the second primary driving circuitry may be the same as a connection mode of the plurality of strip-like electrodes in the first primary driving circuitry. Each second switching circuit may be configured to control the corresponding strip-like electrode to be electrically connected to, or electrically disconnected from, the second driving circuit under the control of the second control signal line SW2, as shown in FIGS. 1 and 2. A strip-like electrode SL0 corresponding to the crosstalk position may be connected to a crosstalk compensation signal line $S_{feedback}$. The crosstalk compensation signal line $S_{feedback}$ may be configured to apply a compensation voltage to the corresponding strip-like electrode, so as to enable the quantity of the strip-like electrodes of the $(K+1)^{th}$ periodical grating unit corresponding to the above the corresponding strip-like electrode to be the second value.

It should be appreciated that, in the above embodiment, the quantity of the strip-like electrodes of the $(K+1)^{th}$ periodical grating unit is increased by one strip-like electrode, i.e., SL0. However, the present disclosure is not limited thereto. The quantity of the strip-like electrodes to be added for each periodical grating unit corresponding to the crosstalk position may depend on an actual size of a crosstalk region.

In the embodiments of the present disclosure, the liquid crystal grating includes one first primary driving circuitry 1 and one second primary driving circuitry 2, but the present disclosure is not limited thereto. For example, the quantity of the second primary driving circuitries 2 may be one or more. When the distance between the user and the liquid crystal grating is not within the first range, the crosstalk positions may be different due to different distances, so it is necessary to select a corresponding second primary driving circuitry 2 to drive the plurality of strip-like electrodes 4, so as to perform the compensation at the crosstalk position. The arrangement of the second primary driving circuitries 2 may be determined in accordance with crosstalk information (including the crosstalk positions and the sizes of the crosstalk regions) when the distance between the user and the liquid crystal grating is a predetermined value.

In a possible embodiment of the present disclosure, a same driving signal line is shared by one of the strip-like electrodes in each of the plurality of periodical grating units, and the one of the strip-like electrodes in each of the plurality of periodical grating units is located at a same position with respect to the strip-like electrodes. For example, in FIG. 1, a first driving signal sub-line S1 is shared by first strip-like electrodes S11, SK2, SL1 and SN1 of the respective periodical grating units, a second driving signal sub-line S2 is shared by second strip-like electrodes S12, SK2, SL2 and SN2 of the respective periodical grating units, and an $M^{th}$ driving signal sub-line SM is shared by $M^{th}$ strip-like electrodes S1M, SKM, SLM and SNM of the respective periodical grating units, so as to control each of the strip-like electrodes for a single periodical grating unit independently (FIG. 1 shows a situation where the plurality of the strip-like electrodes is driven by the second primary driving circuitry; in FIG. 1, the electrode SL0 corresponding to the crosstalk position is connected to the crosstalk compensation signal line $S_{feedback}$, and a connection mode of the strip-like electrodes corresponding to the periodical grating unit at the crosstalk position is different from that corresponding to each of the other periodical grating units).

Figure 7:
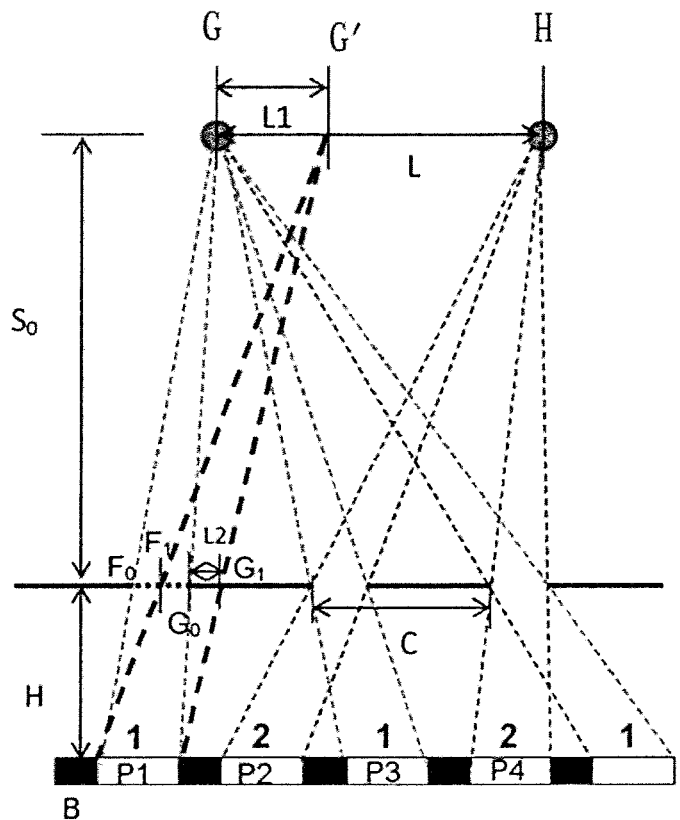
FIG. 7 is still yet another schematic view showing the optical path according to one embodiment of the present disclosure.

Each periodical grating unit may include M electrodes. Considering that the crosstalk may also occur when the distance between the user and the liquid crystal grating is a certain value and the user moves from left to right or from right to left as viewed in the drawings (i.e., moves in a direction parallel to an extension direction of the liquid crystal grating), the signal lines S1 to $S_M$ may be provided for the M electrodes respectively. As shown in FIG. 7, when the left eye is located at a left eye position G, it is able for the left eye to view P1 (i.e., a left-eye image 1) rather than a right-eye image 2, through the grating light-transmitting section F0G0, and correspondingly, it is able for the right eye to view the right-eye image 2 rather than the left-eye image 1 through the grating light-transmitting section. The left-eye image and the right-eye image may be combined in the brain, so as to form a 3D image. When the left eye moves to a left eye position G', it is impossible for the left eye to view the entire left-eye image 1 through the original grating light-transmitting section F0G0, but it is able to view a part of the right-eye image 2, i.e., the crosstalk may occur, so the 3D display effect may be degraded, and even it is impossible to achieve the 3D display effect. At this time, the light-transmitting section may be adjusted to a further position F1G1, so as to enable the left eye to view P1, i.e., the left-eye image 1. In a word, when the eyes of the user moves from left to right or from right to left, it is able to ensure each eye of the user to view a 2D display screen at a same position through adjusting the position of the grating light-transmitting section in real time, thereby to ensure the 3D display effect.

In order to overcome the crosstalk generated due to the movement of the user from left to right or from right to left, a position of the user may be determined through an eye position information determination structure using an eye tracking technique, and then all the periodical grating units may be moved correspondingly. In this way, it is able to ensure the left eye and the right eye to view the corresponding images respectively, thereby to prevent the occurrence of crosstalk. To be specific, each periodical grating unit may remain unchanged, and instead, a position of the light-transmitting section of each periodical grating unit may be adjusted. For example, the position of each periodical grating unit may be adjusted through adjusting positions of the strip-like electrodes of each periodical grating unit. For example, when it intends to move the position of the grating light-transmitting section to the right by a distance equal to a width of one electrode, the electrodes of a first periodical grating unit may be changed to S12, S13, . . . , S1M, and S21, the electrodes of a second periodical grating unit may be changed to S22, . . . , S2M and S31, and so on, and the electrodes of an $N^{th}$ periodical grating unit may be changed to SN2, . . . , SNM and SN(M+1). In addition, a voltage applied to each of the strip-like electrodes S21, S31 and SN(M+1) may be changed, so as to adjust the gratings corresponding to the strip-like electrodes S21, S31 and SN(M+1) to be a light-transmitting section or a light-shielding section, thereby to achieve the translation of the periodical grating units. N and M may each be a positive integer.

When the movement of the user from left to right or from right to left is not taken into consideration, in a possible embodiment of the present disclosure, merely two driving signal lines, i.e., one first driving signal line and one second driving signal line, may be provided for each primary driving circuitry (of the first primary driving circuitry and the second primary driving circuitry). It should be appreciated that, the crosstalk compensation signal line may also be provided for the second primary driving circuitry. The first driving signal line may be configured to apply a voltage to the corresponding strip-like electrode so as to form the grating light-shielding section, and the second driving signal line may be configured to apply a voltage to the corresponding strip-like electrode so as to form the grating light-transmitting section.

It should be appreciated that, when it is necessary to apply different voltages to the respective strip-like electrodes of to each periodical grating unit so as to enable liquid crystals corresponding to the respective strip-like electrodes to deflect at different levels and thereby form the liquid crystal grating with a special structure (e.g., a liquid crystal lens grating), the plurality of strip-like electrodes corresponding to each periodical grating unit may be controlled via a plurality of driving signal lines respectively.

The quantity of the driving signal lines for applying the voltage to the strip-like electrodes so as to form the grating light-shielding section and the quantity of the driving signal lines for applying the voltage to the strip-like electrodes so as to form the grating light-transmitting section may be set in accordance with the practical need, which should not be limited to the above descriptions.

The determination of the crosstalk position and the crosstalk region will be described hereinafter by taking the distance between the user and the liquid crystal grating being S1 as an example when the crosstalk occurs.

FIG. 3 shows a principle of glasses-free 3D display when the distance between the user and the liquid crystal grating is S (S is an optimum viewing distance, i.e., at this time an optimum 3D display effect may be achieved and no crosstalk may occur). Usually, a display device may include a display panel 300 and a grating, e.g., the liquid crystal grating 400. The liquid crystal grating 400 may include a plurality of grating periods c, and each grating period may include a light-transmitting section Ww and a light-shielding section Wb (in FIG. 3, Ww has a same width as Wb, but the present disclosure is not limited thereto). The display panel may be configured to display images 1 and images 2, and there is a tiny difference between two adjacent images. Each image 1 may be viewed by the user's left eye, and each image 2 may be viewed by the user's right eye. The images 1 and 2 may be combined in the brain, so as to acquire a 3D image. In FIG. 3, H represents a height of a position of the grating (i.e., a distance between the liquid crystal grating and the display panel), S represents the optimum viewing distance (S is within the first range), L represents an interpupillary distance of the user's eyes, and P represents a width of a pixel or subpixel of the display panel.

In FIG. 4, each solid line represents an optical path when the distance between the user and the liquid crystal grating 400 is S1, and each dotted line represents an optical path when the distance between the user and the liquid crystal grating 400 is S. As shown in FIG. 4, when the distance between the user and the liquid crystal grating 400 is S, a region B-B1 corresponding to the image 1 may be viewed by the user's left eye through a grating light-transmitting section A0-C. When the distance between the user and the liquid crystal grating 400 is S1, a region A-C1 of the display panel 300 may be viewed by the user's right eye through a light-transmitting section A0-C. A region B-C1 corresponds to the image 1, and a region AB corresponds to the image 2. At this time, the image 1 and the image 2 may be viewed by the user's left eye simultaneously, so the crosstalk may occur. In addition, as obviously shown in FIG. 4, when a position on the display panel 300 viewed by the eyes through the liquid crystal grating 400 moves gradually to an edge of the display panel 300, the crosstalk region may increase gradually too. For example, a region E-CK of the display panel 300 may be viewed by the left eye through a light-transmitting section AK-D, a region F-CK corresponds to the image 1, a region EF corresponds to the image 2, and the region EF is obviously larger than the region AB.

A size of the crosstalk region EF may be calculated as follows.

As shown in FIG. 4, C-A1 represents a light-shielding section of the first periodical grating unit, and Q-AK represents a light-shielding section of the $K^{th}$ periodical grating unit.

When a line parallel to the liquid crystal grating and spaced apart from the liquid crystal grating by the viewing distance S is taken as an X axis, a line passing through a center between the user's eyes and perpendicular to the X axis is taken as a Y axis and an intersect O of the X axis and the Y axis is taken as an origin, coordinate values of G may be (−L/2, 0), coordinate values of J may be (−L/2, S−S1), coordinate values of AK may be (K*c−Ww/2, S), and coordinate values of D may be (K*c+Ww/2, S).

A linear equation of a line passing through the point G and the point AK may be y=S/(K*c−Ww/2+L/2)x+S*L/(2K*c−Ww+L), so coordinate values of the point F may be (((S+H)*(2K*c+Ww+L)−LS)/2S, H+S).

Identically, a linear equation of a line passing through the point J and the point AK may be y=S1/(K*c−Ww/2+L/2)x+S−S1+S1*L/(2K*c−Ww+L), so coordinate values of the point E may be (((S1+H)*(2K*c+Ww+L)−S1*L)/2S1, H+S).

Based on the coordinate values of the points E and F, the size of the region EF may be calculated through the following equation:

$$EF=(K*c-Ww/2+L/2)*H*(1/S-1/S1) \quad (1).$$

A linear equation of a line passing through the points J and D may be y=S1/(K*c+Ww/2+L/2)x+S−S1+S1*L/(2K*c+Ww+L), so coordinate values of CK may be (((S1+H)*(2K*c+Ww+L)−S1L)/2S1, H+S). Based on the coordinate values of the points F and CK, a size of the region F-CK may be calculated through the following equation:

$$F\text{-}CK=Ww+H(K*c+L/2)*(1/S1-1/S)+H*Ww/2*(1/S1+1/S) \quad (2).$$

Based on the above (1) and (2), the size of the crosstalk region may increase along with the increasing K (the size of the region EF is greater than the size of the region AB). In addition, a crosstalk level caused by the light-transmitting section of each periodical grating unit may the same, and its value may be calculated through the equation $D_{crosstalk}=c*H*(1/S-1/S1)$. The crosstalk value may be accumulated when a sight line of the user moves to the edge of the display panel 300, so the sizes of the crosstalk region may increase toward the edge of the display panel 300.

Based on the principle of similar triangles, in FIG. 3, ΔDAB is similar to ΔDGH, so H=PS/L (3); and ΔQEF is similar to ΔQGH, so EF/GH=H/(H+S) (4). In the equation (4), EF=c/2. Based on the equations (3) and (4), c=2PL/(L+P), so Ww=c/2=PL/(L+P). At this time, the size of the region EF may be calculated through the equation: EF=((4K−1)*P/(2*(L+P))+1/2)*PS*(1/S−1/S1) (5).

Based on the equation (5), when the distance between the user and the liquid crystal grating 500 is constant, the crosstalk level caused by different liquid crystal gratings 400 may be a constant value.

It should be appreciated that, in the above calculation, a width of the black matrix of the display panel 300 is not taken into consideration. When the width of the black matrix is taken into consideration, a size of an actual crosstalk region may be EF-B/2, where B represents the width of the black matrix.

In order to acquire a good 3D display effect, the crosstalk compensation may be performed when the crosstalk occurs, so that EF-B/2=0, i.e., K=(B/(PS(1/S−1/S1))−1)*(L+P)/(4P)+1/4. It should be appreciated that, it is necessary to round a value of K.

When the display panel 300 has a resolution of 4N in a horizontal direction and the left-eye image and the right-eye image are combined to acquire the 3D image, the liquid crystal grating 400 may include 2N periods totally, i.e., the liquid crystal grating 400 may include N periods from a center to an edge of the display panel 300.

When the distance between the user and the liquid crystal grating 400 is S1, it is necessary to perform the compensation for Q times, where Q=N/K.

Taking a 5.46-inch Quad High Definition (QHD) glasses-free 3D display device (having a resolution of 1440 (vertical)*2560 (horizontal)) as an example, the values of K and Q may be calculated. When P=47.25 μm, B=16 μm, L=65 mm, S=350 mm and S1=500 mm, the value of K may be 44 based on the equation K=(B/(PS(1/S−1/S1))−1)*(L+P)/(4P)+1/4.

For the 5.46-inch QHD glasses-free 3D display device, when the left-eye image and the right-eye image are combined to acquire the 3D image, N=2560/4=640, and Q=N/K=640/44=11. Here, the value of Q is rounded.

A method for compensating the crosstalk caused will be described hereinafter when the distance between the user and the liquid crystal grating 400 is S1.

As shown in FIG. 5, when the left eye is located at the point G, the region AB of the display panel 300 may be viewed through a light-transmitting section KQ of the $K^{th}$ periodical grating unit, and the region CD of the display panel 300 may be viewed through a light-transmitting section RT of the $(K+1)^{th}$ periodical grating unit. It is found that, when the distance between the user and the liquid crystal grating 400 is S, there is no crosstalk in the center of the display panel 300 and at the edge of the display panel 300. When the left eye is located at the point J, the region EF of the display panel 300 may be viewed through the light-transmitting section KQ of the $K^{th}$ periodical grating unit, and the region GH of the display panel 300 may be viewed through the light-transmitting section RT of the $(K+1)^{th}$ periodical grating unit. It is found that, when the distance between the user and the liquid crystal grating 400 is S1, an edge of the black matrix of the display panel 300 may be viewed by the left eye through the $K^{th}$ periodical grating unit, and a region of the display panel 300 (i.e., the crosstalk region) beyond the corresponding black matrix may be viewed by the left eye through the $(K+1)^{th}$ periodical grating unit. In order to achieve a good 3D display effect, it is necessary to compensate for the $(K+1)^{th}$ grating.

As shown in FIG. 6, the $(K+1)^{th}$ periodical grating unit QT' has a light-shielding section QR'. After the compensation, when the eye is located at the point J, the region CD of the display panel 300 may be viewed through a light-transmitting section R'T' of the $(K+1)^{th}$ periodical grating unit, where the points C and D represent centers of two adjacent black matrices respectively. At this time, a grating period of the $(K+1)^{th}$ periodical grating unit may increase, especially, the light-shielding section of the $(K+1)^{th}$ periodical grating unit may increase.

QR' may be calculated on the basis of the principle of similar triangles.

$\Delta JKR'$ is similar to $\Delta JEC$, so $KR'/(2P+B/2)=S1/(S1+H)$. In FIG. 3, $\Delta DAB$ is similar to $\Delta DGH$, so $H=PS/L$. Hence, $KR'=(2P+B/2)*S1*L/(S1*L+PS)$. For the $(K+1)^{th}$ periodical grating unit, $QT'=KR'=(2P+B/2)*S1*L/(S1*L+PS)$, so a width of an increased portion of the light-shielding section of the $(K+1)^{th}$ periodical grating unit, i.e., QR'-IK, may be calculated through the equation:

$$QR'\text{-}IK=(2P+B/2)*S1*L/(S1*L+PS)-2PL/(L+P).$$

For the 5.46-inch QHD glasses-free 3D display device, QR'-IK=8.003 μm, and this value approximates to half of the width of each black matrix of the display panel.

In this embodiment, as shown in FIG. 1, the liquid crystal grating 400 may include N periodical grating units, including the strip-like electrodes S11 to SNM. The first primary driving circuitry may include driving signal lines $S_1$ to $S_M$, and the first control signal line SW1. The second primary driving circuitry may include the driving signal lines $S_{M+1}$ to $S_{2M}$, the second control signal line SW2 and the compensation signal line $S_{feedback}$.

To be specific, each periodical grating unit may include M strip-like electrodes, and the quantity of the periodical grating units may be N. Taking the first periodical grating unit as an example, it may include the strip-like electrodes S11, S12, . . . , and S1M. When the distance between the user and the liquid crystal grating 400 is S, the plurality of strip-like electrodes may be driven by the first primary driving circuitry, and the strip-like electrodes in the first periodical grating unit may be connected to the driving signal lines $S_1$ to $S_M$ via the first switching circuits respectively. As shown in FIG. 2, the first strip-like electrodes S11, SK1, SL1 and SN1 of the periodical grating units may be connected to the driving signal line $S_1$ through the corresponding first switching circuits, and the last strip-like electrodes S1M, SKM, SLM and SNM of the periodical grating units may be connected to the driving signal line $S_M$ through the corresponding first switching circuit.

When the distance between the user and the liquid crystal grating 400 is S1, the plurality of strip-like electrodes may be driven by the second primary driving circuitry. At this time, the periodical grating unit corresponding to the crosstalk position may be different from that corresponding to the crosstalk-free position, and the former may have a size greater than the latter. As shown in FIG. 1, the $(K+1)^{th}$ periodical grating unit includes M+1 strip-like electrodes, with an additional strip-like electrode SL0 as a crosstalk compensation electrode connected to a crosstalk compensation signal line $S_{feedback}$ via the corresponding second switching circuit. It should be appreciated that, the quantity of the compensation signal lines may be one or more (e.g., when the periodical grating unit corresponding to the crosstalk position further includes two additional strip-like electrodes, the quantity of the compensation signal lines may correspond to the quantity of the additional strip-like electrodes, i.e., there may be two compensation signal lines). The quantity of the compensation signal lines may depend on the value of an increased portion of the periodical grating unit, i.e., QR'-IK, and a width of an individual strip-like electrode.

It should be appreciated that, depending on different viewing distances, the same strip-like electrode may be connected to different driving signal lines (i.e., driven by different primary driving circuitries). When the plurality of strip-like electrodes is driven by the first primary driving circuitry, the first strip-like electrode SL1 of the $(K+1)^{th}$ periodical grating unit maybe connected to the driving signal line $S_1$, the second strip-like electrode SL2 may be connected to the driving signal line $S_2$, and the last strip-like electrode SLM may be connected to the driving signal line $S_M$, so the crosstalk may occur. When the plurality of strip-like electrodes is driven by the second primary driving circuitry, the first strip-like electrode SL0 of the $(K+1)^{th}$ periodical grating unit (i.e., the strip-like electrode SL1 when the plurality of strip-like electrodes is driven by the first primary driving circuitry) may be connected to the crosstalk compensation signal line $S_{feedback}$, the second strip-like electrode SL1 (i.e., the strip-like electrode SL2 when the plurality of strip-like electrodes is driven by the first primary driving circuitry) may be connected to the driving signal line $S_{M+1}$, and the last strip-like electrode SLM may be connected to the driving signal line $S_{2M}$. For the strip-like electrode corresponding to the position where the crosstalk compensation is required and the strip-like electrodes at a side of the position where the crosstalk compensation is required and away from the center of the display panel 300, the connection modes of these strip-like electrodes may change sequentially, so as to increase the size of the $(K+1)^{th}$ periodical grating unit corresponding to the crosstalk position. The periodical grating units at a right side of the $(K+1)^{th}$ periodical grating unit (as viewed in the drawings) may be translated to the right sequentially, so the periodical grating unit corresponding to the crosstalk-free position may remain unchanged.

As shown in FIG. 2, the $K^{th}$ periodical grating unit may include M strip-like electrodes, among which SK1, SK2, . . . , and SKM/2 may form the light-shielding section, and SK(M/2+1) to SKM may form the light-transmitting section. The $(K+1)^{th}$ periodical grating unit may include M+1 strip-like electrodes, and as compared with the $K^{th}$ periodical grating unit, it may further include the additional strip-like electrode SL0 corresponding to a position where the light-shielding section is formed.

In this embodiment, as shown in FIG. 10, the control circuitry may be connected to the first primary driving circuitry 1 and the second primary driving circuitry 2, and include a distance detection circuit configured to detect the distance between the user and the liquid crystal grating.

In a possible embodiment of the present disclosure, the control circuitry may further include a determination sub-circuit and a control sub-circuit. The determination sub-circuit may be configured to determine whether the distance between the user and the liquid crystal grating is within a first range, transmit a first indication signal to the control sub-circuit when the distance between the user and the liquid crystal grating is within the first range, and transmit a second indication signal to the control sub-circuit when the distance between the user and the liquid crystal grating is within a second range different from the first range. The control sub-circuit may be configured to: upon the receipt of the first indication signal, transmit a turn-on control signal to the first control signal line so as to control the first primary driving circuitry to drive the plurality of strip-like electrodes, and apply a turn-off control signal to the second control signal line; and upon the receipt of the second indication signal, apply the turn-off control signal to the first control signal line, and apply the turn-on control signal to the second control signal line so as to control the second primary driving circuitry to drive the plurality of strip-like electrodes.

Through the control circuitry, when the distance between the user and the liquid crystal grating is within the first range, i.e., when no crosstalk occurs, the plurality of strip-like electrodes may be driven by the first primary driving circuitry, and when the distance between the user and the liquid crystal grating is within the second range, i.e., when the crosstalk occurs, the plurality of strip-like electrodes may be driven by the corresponding second primary driving circuitry, so as to compensate for the crosstalk. The second range may be set according to the practical need, and the quantity of the second primary driving circuitries may be set according to the practical need. For different distances, different crosstalk positions may occur, and the crosstalk region may have different sizes. Through the second primary driving circuitries corresponding to the respective distances, it is able to determine the corresponding second primary driving circuitry in accordance with the distance between the user and the liquid crystal grating, thereby to drive the plurality of strip-like electrodes, compensate for the crosstalk, and improve the 3D display effect at different distances.

The present disclosure further provides in some embodiments a 3D display device, which includes a display panel and the above-mentioned liquid crystal grating arranged at a light-exiting side of the display panel, so as to achieve the glasses-free 3D display.

Figure 8:
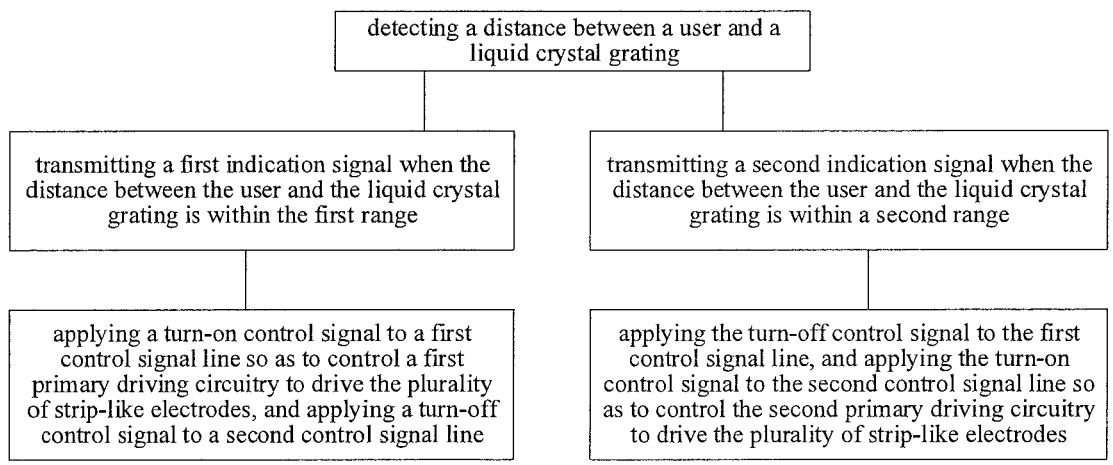
FIG. 8 is a flow chart of a method for driving the liquid crystal grating according to one embodiment of the present disclosure.

The present disclosure further provides in some embodiments a method for driving the above-mentioned liquid crystal grating which, as shown in FIG. 8, includes: detecting a distance between a user and the liquid crystal grating; and selecting the first primary driving circuitry or one of the second primary driving circuitries to drive the plurality of strip-like electrodes.

In a possible embodiment of the present disclosure, the selecting the first primary driving circuitry or one of the second primary driving circuitries to drive the plurality of strip-like electrodes includes: determining whether the distance between the user and the liquid crystal grating is within a first range, transmitting a first indication signal when the distance between the user and the liquid crystal grating is within the first range, and transmitting a second indication signal when the distance between the user and the liquid crystal grating is within the second range; upon the receipt of the first indication signal, applying a turn-on control signal to the first control signal line so as to control the first primary driving circuitry to drive the plurality of strip-like electrodes, and applying a turn-off control signal to the second control signal line. The control unit is configured to, upon the receipt of the second indication signal, apply the turn-off control signal to the first control signal line, and apply the turn-on control signal to the second control signal line so as to control the second primary driving circuitry to drive the plurality of strip-like electrodes.

When the distance between the user and the liquid crystal grating is within the first range, i.e., when no crosstalk occurs, the plurality of strip-like electrodes may be driven by the first primary driving circuitry. When the distance between the user and the liquid crystal grating is within the second range, i.e., when the crosstalk occurs, the plurality of strip-like electrodes may be driven by the corresponding second primary driving circuitry, so as to compensate for the crosstalk. The second range may be set according to the practical need, and the quantity of the second primary driving circuitries may be set according to the practical need. For different distances, different crosstalk positions may occur, and the crosstalk region may have different sizes. Through the second primary driving circuitries corresponding to the distances, it is able to determine the corresponding second primary driving circuitry in accordance with the distance between the user and the liquid crystal grating, thereby to drive the plurality of strip-like electrodes, compensate for the crosstalk, and improve the 3D display effect at different distances.

The above embodiments are for illustrative purposes only. Obviously, a person skilled in the art may make further modifications and improvements without departing from the spirit of the present disclosure, and these modifications and improvements shall also fall within the scope of the present disclosure.

What is claimed is:

1. A liquid crystal grating, comprising:
   a plurality of periodical grating units, wherein each of the plurality of periodical grating units comprises a first substrate, a second substrate arranged opposite to the first substrate, and a liquid crystal layer arranged between the first substrate and the second substrate, and a plurality of strip-like electrodes is arranged on the first substrate;
   a first primary driving circuitry configured to drive the plurality of strip-like electrodes, to form a light-shielding section and a light-transmitting section in each of the plurality of periodical grating units, and the quantity of the strip-like electrodes in each of the plurality of periodical grating units is a first value;
   at least one second primary driving circuitry configured to drive the plurality of strip-like electrodes, to form the light-shielding section and the light-transmitting section in each of the plurality of periodical grating units, enable the quantity of the strip-like electrodes in each of ones of the periodical grating units corresponding to a crosstalk-free position to be the first value, and enable the quantity of the strip-like electrodes in each of other ones of the periodical grating units corresponding to a crosstalk position to be a second value, wherein the second value is greater than the first value; and a control circuitry configured to select the first primary driving circuitry or one of the at least one second primary driving circuitry to drive the plurality of strip-like electrodes in accordance with a distance between a user and the liquid crystal grating.

2. The liquid crystal grating according to claim 1, wherein the first primary driving circuitry comprises a first driving circuit and a plurality of first switching circuits, wherein each of the first switching circuits comprises a control end, a first end and a second end;

the plurality of strip-like electrodes corresponds to the plurality of first switching circuits respectively, the first end of each of the first switching circuits is connected to a respective one of the strip-like electrodes, the second end of each of the first switching circuits is connected to the first driving circuit, and the control end of each of the first switching circuits is connected to a first control signal line;

each of the first switching circuits is configured to enable the respective strip-like electrode to be electrically connected to, or electrically disconnected from, the first driving circuit under the control of the first control signal line; and the first driving circuit is configured to apply a first voltage to ones of the strip-like electrodes for forming the light-shielding section, and apply a second voltage to other ones of the strip-like electrodes for forming the light-transmitting section, wherein the second voltage is different from the first voltage.

3. The liquid crystal grating according to claim 2, wherein the first driving circuit comprises a first driving sub-circuit, the first driving sub-circuit is connected to the second end of a respective one of the first switching circuits via at least one first driving signal line, and configured to apply the first voltage to the ones of the strip-like electrodes for forming the light-shielding section; and the first driving sub-circuit is further connected to the second end of the respective one of the first switching circuits via at least one second driving signal line, and configured to apply the second voltage to the other ones of the strip-like electrodes for forming the light-transmitting section.

4. The liquid crystal grating according to claim 3, wherein each of the first switching circuits is a Thin Film Transistor (TFT), and a same driving signal line is shared by one of the strip-like electrodes in each of the plurality of periodical grating units, and the one of the strip-like electrodes in each of the plurality of periodical grating units is located at a same position with respect to the strip-like electrodes.

5. The liquid crystal grating according to claim 1, wherein the second primary driving circuitry comprises a second driving circuit, and a plurality of second switching circuits, wherein each of the second switching circuits comprises a control end, a first end and a second end;

the plurality of strip-like electrodes corresponds to the plurality of second switching circuits respectively, the first end of each of the second switching circuits is connected to a respective one of the strip-like electrodes, the second end of each of the second switching circuits is connected to the second driving circuit, and the control end of each of the second switching circuits is connected to a second control signal line;

each of the second switching circuits is configured to enable the respective strip-like electrode to be electrically connected to, or electrically disconnected from, the second driving circuit under the control of the second control signal line; and the second driving circuit is configured to apply a first voltage to a portion of ones of the strip-like electrodes corresponding to a crosstalk-free position to form the light-shielding section, apply a second voltage to another portion of the ones of the strip-like electrodes corresponding to the crosstalk-free position to form the light-transmitting section, and apply a crosstalk compensation voltage to ones of the strip-like electrodes corresponding to the crosstalk position, to enable the quantity of the strip-like electrodes in each of ones of the periodical grating units corresponding to the crosstalk position to be the second value, wherein the second voltage is different from the first voltage.

6. The liquid crystal grating according to claim 5, wherein the second driving circuit comprises:

a second driving sub-circuit connected to the second end of a respective one of the second switching circuits via a driving signal line, and configured to apply a voltage to ones of the strip-like electrodes corresponding to the crosstalk-free position, to form the light-shielding section and the light-transmitting section in the each of ones of the periodical grating units corresponding to the crosstalk-free position; and a third driving sub-circuit connected to the second ends of ones of the second switching circuits corresponding to the crosstalk position via a crosstalk compensation signal line, and configured to apply the crosstalk compensation voltage to at least one of the plurality of strip-like electrodes, to enable the quantity of the strip-like electrodes for the periodical grating unit corresponding to the at least one of the strip-like electrodes to be the second value.

7. The liquid crystal grating according to claim 6, wherein each of the second switching circuits is a TFT, and a same driving signal line is shared by one of the strip-like electrodes in each of the plurality of periodical grating units, and the one of the strip-like electrodes in each of the plurality of periodical grating units is located at a same position with respect to the strip-like electrodes.

8. The liquid crystal grating according to claim 1, wherein the control circuitry comprises:

a distance detection circuit configured to detect the distance between the user and the liquid crystal grating.

9. The liquid crystal grating according to claim 8, wherein the control circuitry further comprises a determination sub-circuit and a control sub-circuit, the determination sub-circuit is configured to determine whether the distance between the user and the liquid crystal grating is within a first range, transmit a first indication signal to the control sub-circuit in the case that the distance between the user and the liquid crystal grating is within the first range, and transmit a second indication signal to the control sub-circuit in the case that the distance between the user and the liquid crystal grating is within a second range, wherein the second range is different from the first range;

the control sub-circuit is configured to: upon the receipt of the first indication signal, control the first primary driving circuitry to drive the plurality of strip-like electrodes; and upon the receipt of the second indication signal, control the second primary driving circuitry to drive the plurality of strip-like electrodes.

10. A method for driving the liquid crystal grating according to claim 1, comprising:

detecting the distance between the user and the liquid crystal grating; and selecting the first primary driving circuitry or one of the second primary driving circuitries to drive the plurality of strip-like electrodes.

11. The method according to claim 10, wherein the selecting the first primary driving circuitry or one of the second primary driving circuitries to drive the plurality of strip-like electrodes comprises:

determining whether the distance between the user and the liquid crystal grating is within a first range, transmitting a first indication signal in the case that the distance between the user and the liquid crystal grating is within the first range, and transmitting a second indication signal in the case that the distance between the user and the liquid crystal grating is within a second range, wherein the second range is different from the first range;

upon the receipt of the first indication signal, controlling the first primary driving circuitry to drive the plurality of strip-like electrodes; and upon the receipt of the second indication signal, controlling the second primary driving circuitry to drive the plurality of strip-like electrodes.

12. A three-dimensional (3D) display device, comprising a display panel and the liquid crystal grating according to claim 1.

13. The 3D display device according to claim 12, wherein the first primary driving circuitry comprises a first driving circuit and a plurality of first switching circuits, wherein each of the first switching circuits comprises a control end, a first end and a second end;

the plurality of strip-like electrodes corresponds to the plurality of first switching circuits respectively, the first end of each of the first switching circuits is connected to a respective one of the strip-like electrodes, the second end of each of the first switching circuits is connected to the first driving circuit, and the control end of each of the first switching circuits is connected to a first control signal line;

each of the first switching circuits is configured to enable the respective strip-like electrode to be electrically connected to, or electrically disconnected from, the first driving circuit under the control of the first control signal line; and the first driving circuit is configured to apply a first voltage to ones of the strip-like electrodes for forming the light-shielding section, and apply a second voltage to other ones of the strip-like electrodes for forming the light-transmitting section, wherein the second voltage is different from the first voltage.

14. The liquid crystal grating according to claim 13, wherein the first driving circuit comprises a first driving sub-circuit, the first driving sub-circuit is connected to the second end of a respective one of the first switching circuits via at least one first driving signal line, and configured to apply the first voltage to the ones of the strip-like electrodes for forming the light-shielding section; and the first driving sub-circuit is further connected to the second end of the respective one of the first switching circuits via at least one second driving signal line, and configured to apply the second voltage to the other ones of the strip-like electrodes for forming the light-transmitting section.

15. The 3D display device according to claim 14, wherein each of the first switching circuits is a TFT, and a same driving signal line is shared by one of the strip-like electrodes in each of the plurality of periodical grating units, and the one of the strip-like electrodes in each of the plurality of periodical grating units is located at a same position with respect to the strip-like electrodes.

16. The 3D display device according to claim 12, wherein the second primary driving circuitry comprises a second driving circuit, and a plurality of second switching circuits, wherein each of the second switching circuits comprises a control end, a first end and a second end;

the plurality of strip-like electrodes corresponds to the plurality of second switching circuits respectively, the first end of each of the second switching circuits is connected to a respective one of the strip-like electrodes, the second end of each of the second switching circuits is connected to the second driving circuit, and the control end of each of the second switching circuits is connected to a second control signal line;

each of the second switching circuits is configured to enable the respective strip-like electrode to be electrically connected to, or electrically disconnected from, the second driving circuit under the control of the second control signal line; and the second driving circuit is configured to apply a first voltage to a portion of ones of the strip-like electrodes corresponding to a crosstalk-free position to form the light-shielding section, apply a second voltage to another portion of the ones of the strip-like electrodes corresponding to the crosstalk-free position to form the light-transmitting section, and apply a crosstalk compensation voltage to ones of the strip-like electrodes corresponding to the crosstalk position, to enable the quantity of the strip-like electrodes in each of ones of the periodical grating units corresponding to the crosstalk position to be the second value, wherein the second voltage is different from the first voltage.

17. The 3D display device according to claim 16, wherein the second driving circuit comprises:

a second driving sub-circuit connected to the second end of a respective one of the second switching circuits via a driving signal line, and configured to apply a voltage to ones of the strip-like electrodes corresponding to the crosstalk-free position, to form the light-shielding section and the light-transmitting section in each of ones of the periodical grating units corresponding to the crosstalk-free position; and a third driving sub-circuit connected to the second ends of ones of the second switching circuits corresponding to the crosstalk position via a crosstalk compensation signal line, and configured to apply the crosstalk compensation voltage to at least one of the plurality of strip-like electrodes, to enable the quantity of the strip-like electrodes for the periodical grating unit corresponding to the at least one of the strip-like electrodes to be the second value.

18. The 3D display device according to claim 17, wherein each of the second switching circuits is a TFT, and a same driving signal line is shared by one of the strip-like electrodes in each of the plurality of periodical grating units, and the one of the strip-like electrodes in each of the plurality of periodical grating units is located at a same position with respect to the strip-like electrodes.

19. The 3D display device according to claim 12, wherein the control circuitry comprises:

a distance detection circuit configured to detect the distance between the user and the liquid crystal grating.

20. The 3D display device according to claim 19, wherein the control circuitry further comprises a determination sub-circuit and a control sub-circuit, the determination sub-circuit is configured to determine whether the distance between the user and the liquid crystal grating is within a first range, transmit a first indication signal to the control sub-circuit in the case that the distance between the user and the liquid crystal grating is within the first range, and transmit a second indication signal to the control sub-circuit in the case that the distance between the user and the liquid crystal grating is within a second range, wherein the second range is different from the first range;

the control sub-circuit is configured to: upon the receipt of the first indication signal, control the first primary driving circuitry to drive the plurality of strip-like electrodes; and upon the receipt of the second indication signal, control the second primary driving circuitry to drive the plurality of strip-like electrodes.

\* \* \* \* \*